Feb. 2, 1965  J. J. FERRIS ET AL  3,168,464
PERMANENT MAGNETIC SEPARATOR
Filed Dec. 4, 1961  2 Sheets-Sheet 1

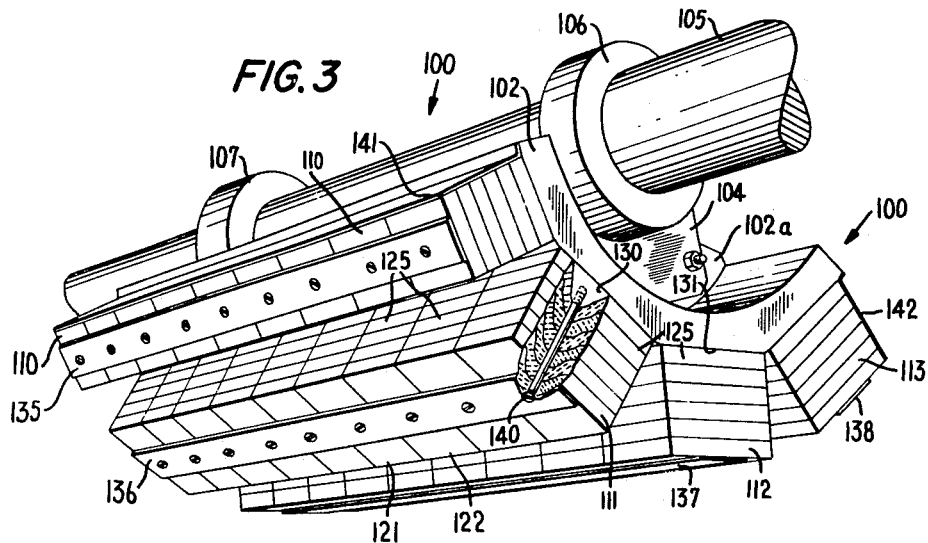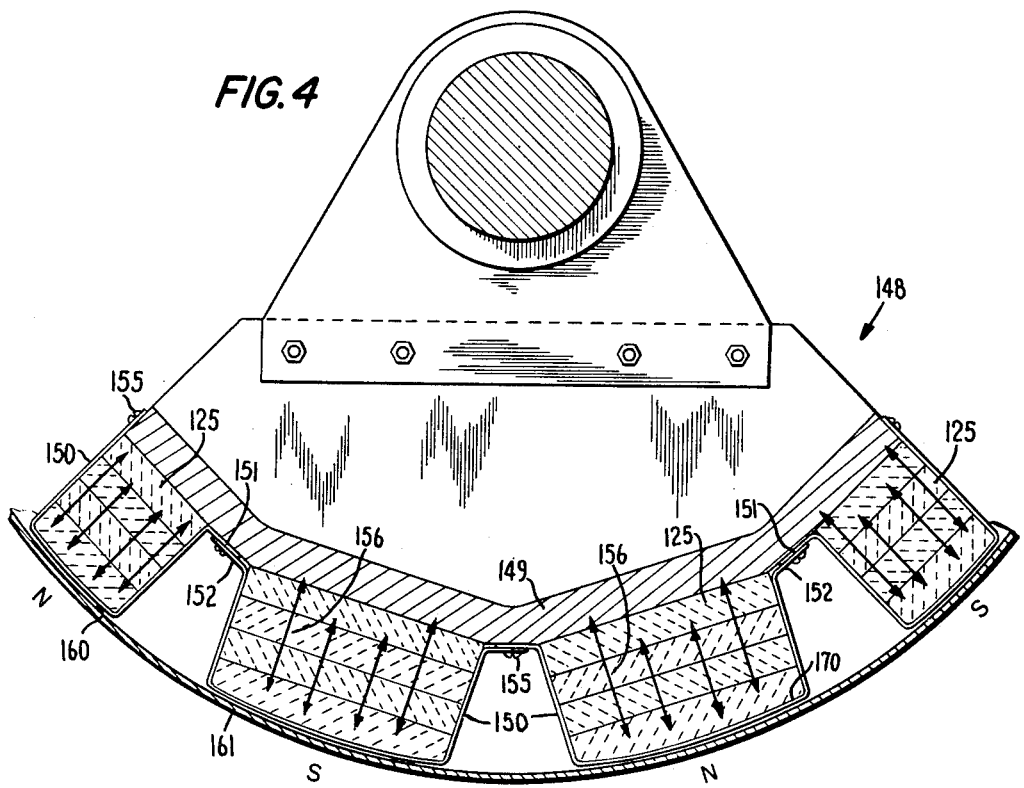

United States Patent Office 3,168,464
Patented Feb. 2, 1965

3,168,464
PERMANENT MAGNETIC SEPARATOR
James J. Ferris, Upper Montclair, and Otto C. Mayer,
Fair Lawn, N.J., assignors, by mesne assignments, to
Eriez Manufacturing Company, Erie, Pa.
Filed Dec. 4, 1961, Ser. No. 156,774
13 Claims. (Cl. 209—223)

This invention relates generally to magnetic attractors and more particularly to drum magnetic separators of the wet and dry type.

Apparatus of the magnetic type for separating or segregating magnetizable and non-magnetizable materials from a mixture or stream of such materials are well known. Conventional magnetic separators have generally utilized an electro-magnet consisting of one or more coils wound on a suitable core necessitating auxiliary equipment for energizing and controlling the electromagnet. Because of the inherent expense and operational difficulties of electromagnetic separators permanent magnets have replaced the electro-magnets in many types of separators and attractors.

Separators with permanent magnets have heretofore made use of ceramic permanent magnets. These devices, however, have been relatively expensive to construct because of the cost of permanent magnet material required for a given application. The methods of mounting the ceramic pole pieces, from which the magnets are formed, have been inefficient and the total available flux in the magnets has not been effectively used to provide total effective energy for separating magnetic and non-magnetic materials, for example, in beneficiating magnetic ores.

It is a principal object of the present invention to provide a separator having a permanent magnet in which the leakage flux is so reduced that substantially all of the flux in the magnets is employed as energy providing useful magnetic fields at greatly reduced costs.

A feature of the present invention is the provision of a new and novel permanent magnet construction comprising a plurality of assemblies of magnetic units, in the form of slabs made, for example, of a magnetic ceramic material forming poles of alternate polarity on the magnet. The slabs or magnetic units each have a greater length and width dimension than thickness with opposite major faces defining the thickness dimension. The magnetic units, within each pole assembly, are arranged in successive stacks contiguous to each other with end-to-end abutting relationship of the units. The magnet units are permanently magnetized in the same direction in each stack through the thickness dimension and in assembly the direction corresponds to a direction substantially normal to the opposite faces defining the thickness dimension.

The stacks are arranged in each assembly of units in a row with an end unit having a major face in intimate contact with a back plate of high magnetic permeability, made for example of steel, on which all of the stacks comprising the permanent magnet are arranged with the individual stack assemblies in angularly spaced relationship. The back plate is mounted concentrically with a rotatably driven drum on the separator which provides a conveyor outer surface to which magnetizable material is attracted as a stream or slurry of material comprising magnetizable material is brought into contact with the outer surface of the drum.

Each of the stacks of magnetic units has an end magnetic unit at the end opposite to the unit seated on the back plate which is disposed substantially adjacent the inner surface of the drum. The back plate, therefore, provides a continuous flux path between the successive stacks of the individual rows comprising the assemblies and a flux path is provided between the angularly spaced assemblies which form poles of alternate polarity so that all of the available flux in the permanent magnet units is available as energy to effectively develop fields of alternate polarity coactive to form a magnetic field of high coercive force to attract the magnetizable material to the outer conveyor surface of the drum.

Other features and advantages of the separator and permanent magnet therein in accordance with the present invention will be better understood as described in the following specification and appended claims, in conjunction with the following drawings, in which:

FIG. 3 is a perspective view of a permanent magnet, according to the invention; and FIG. 4 is an end view, partly in section, of the permanent magnet illustrated in FIG. 1.

Figure 1:
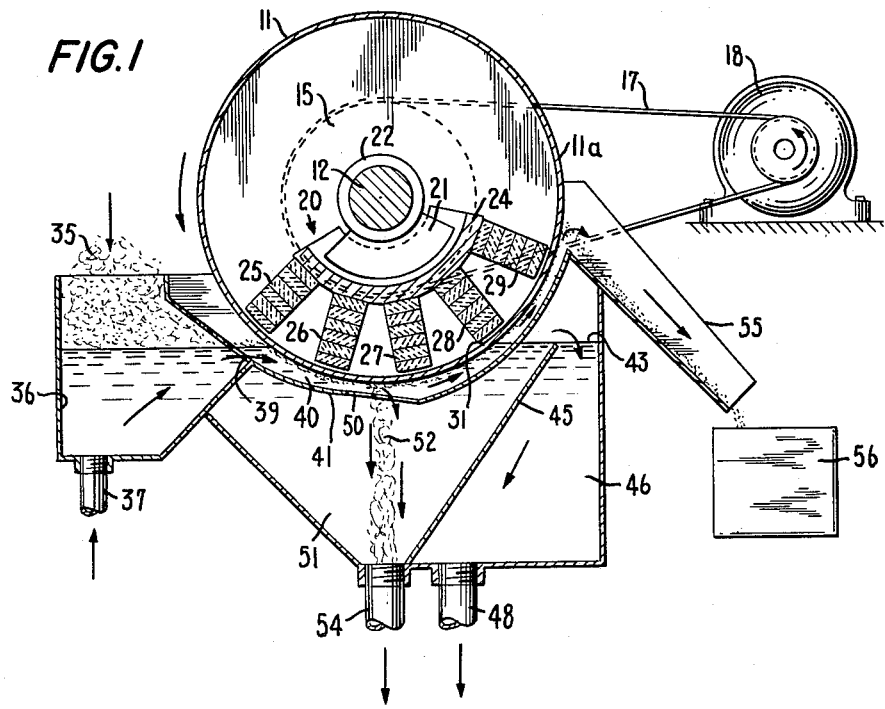
FIG. 1 is a sectional elevation view of separator apparatus provided with a permanent magnet, according to the invention.

The drawing illustrates drum-type magnetic separators employing permanent magnets, according to the invention. The drum-type magnetic separators, according to the drawing, have been constructed specifically for recovering or separating magnetizable materials, for example in iron ore purification in concentrators or for use in second flow processes, for example for removing from coal finally ground iron magnetite. It is to be understood the permanent magnet, according to the invention, is applicable to attractors other than separators.

The magnetic separators illustrated in the drawing are of the wet-drum type. It is to be understood, however, that permanent magnet separators, according to the invention, can be constructed as dry systems. FIG. 1 illustrates a concurrent wet-drum separator comprising a drum or cylindrical shell 11 made of non-magnetic, non-magnetizable metallic material and mounted for rotation about a stationary shaft 12 on bearings, not shown, supported on a framework, not shown. The cylindrical shell 11 is rotatably driven counterclockwise, for example, by a sprocket wheel 15 rotatably driven through a chain drive 17 illustrated diagrammatically from an electric motor 18. The sprocket is suitably secured to one of the end plates, not shown, of the drum or shell.

The shell 11 has an exterior surface 11a that forms a material conveyor operative as hereinafter described. A fixed permanent magnet designated generally by the reference numeral 20 is mounted on the shaft 12 concentrically with the cylindrical shell 11 and interiorly thereof. The magnet comprises support members 21 provided with a hub 22 supporting a back plate 24 preferably having high magnetic permeability. Five pole assemblies 25–29 of alternate polarity are mounted angularly spaced on the back plate 24. These poles extend axially in the cylindrical shell or drum 11. The permanent magnet 20 construction details will be hereinafter described completely. The outermost end faces of the poles are spaced radially inwardly of the inner surfaces of the rotatably driven shell 11, for example, about one-eighth of an inch or one-sixteenth or even three-eights or larger clearance depending upon the size of the separator so that an air gap 31 is formed between the pole end faces and the shell interior surfaces.

Provision is made externally of the cylindrical shell 11 for delivering a slurry or mixture of material comprising magnetizable material and non-magnetizable material to be separated by the attraction of the magnetizable material to the conveyor surface 11a of the cylindrical shell by a coercive magnetic field developed by a permanent magnet 20. The material to be separated designated 35 is delivered to a chamber 36 extending longitudinally of the cylindrical shell. Water is fed into the chamber 36 through a conduit 37 so that a slurry is formed and delivered through an elongated opening 39 in the chamber 36 into a second chamber 40 formed between the drum 11 and plate 41. The water delivered through the inlet conduit 37 is held at a level 43 by suitably controlling the delivery rate and the height of a baffle plate 45 that defines an overflow chamber 46 so that the excess water flows through an overflow outlet conduit 48.

The material 35 moves along between the shell exterior surface and the plate 41 in contact with the shell, and in the same direction as the shell rotation, so that the magnetizable material therein is attracted to the outer surface 11a of the shell or drum and held in position thereon. As the drum rotates the material is agitated by the magnet 20, since the successive fields formed by the assemblies are of alternate polarity, it can readily be appreciated carrying the material through a series of alternating polarity magnetic fields associated with the permanent magnet will rotate the magnetizable materials on the surface of the shell thereby permitting the non-magnetic material or tailings to fall clear of the conveyor outer surface of the shell. The tailings are discharged through an opening 50 into a chamber 51 and are designated generally by the reference number 52. The tailings entering the chamber 52 are discharged from this chamber through an outlet conduit 54. The magnetic material remains attracted to the outer surface of the shell until it comes into a position past the pole 29 so that the permanent magnet 20 is no longer effective and the magnetic material falls off, or it may be scraped by a scraper, not shown, into a discharge chute 55 from which it may be discharged, for example, to a container 56 as magnetic concentrate.

Figure 2:
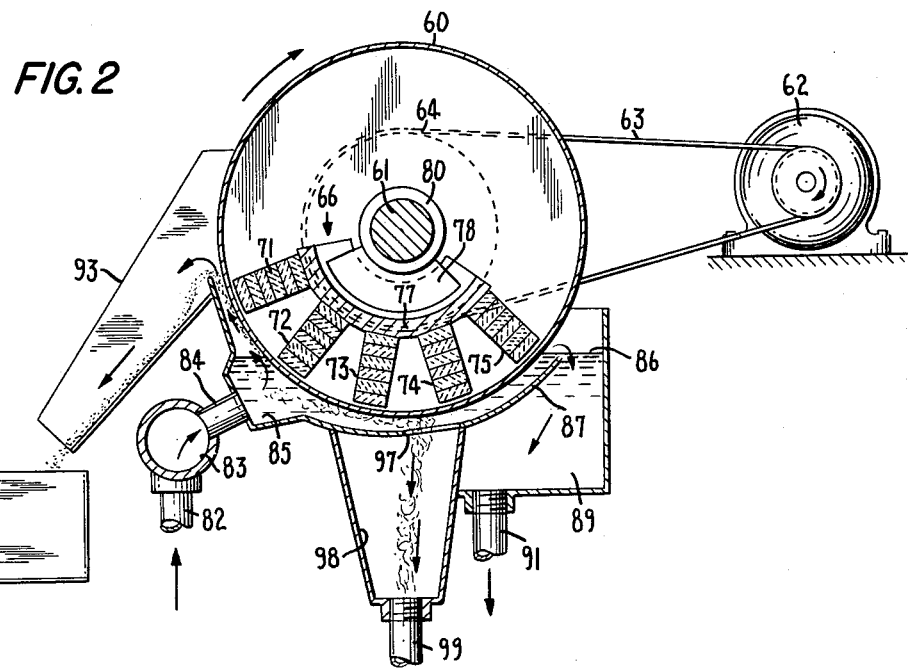
FIG. 2 is a sectional view of another embodiment of separator apparatus provided with a permanent magnet, according to the invention.

In the drawing FIG. 2 illustrates a counter-rotation wet-drum separator in which a rotatably driven cylindrical shell or drum 60 is mounted for rotation on a stationary shaft 61 and is driven clockwise at a suitable preselected speed by an electric motor 62 through a chain drive 63 cooperative with a sprocket wheel 64 mounted on an end plate of the drum, not shown. The apparatus is provided with a permanent magnet 66 mounted on the shaft 61 in a stationary position and concentric with the shell 60. The permanent magnet comprises five pole assemblies 71–75 of alternate polarity secured to a magnetizable back plate 77 mounted depending from support plates 78 having hub 80 circumferentially of the shaft 51. The permanent magnet 66 functions in a manner similar to the magnet 20 heretofore described.

In the embodiment of the apparatus illustrated in FIG. 2 the slurry of material to be separated is provided through a supply or inlet pipe 82 to an elongated chamber 83 and fed through a delivery opening, for example a pipe 84, into a distribution chamber 85. The slurry in the chamber 85 is maintained at a level 86 by the baffle or spillover plate 87 and the controlled rate of feed and any excess of overflow water enters another chamber 89 and is discharged to an overflow outlet pipe 91.

In this type of apparatus the magnetic material is attracted the strongest by the magnetic pole assembly 72 nearest the opening into the distribution chamber and is then agitated as the material is carried into the field of opposite polarity developed by the magnetic assembly 71 and is discharged as magnetic concentrate through a discharge chute 93 into a suitable container illustrated diagrammatically at 95. The material entering the distribution chamber 85 also flows through the chamber in the direction of the pole assembly 73 where further refining or attraction of magnetizable material takes place and the tailings are discharged through an opening 97 into a chamber 98 and out through a tailings discharge outlet pipe 99.

The fixed permanent magnets 20, 66 heretofore generally described are constructed according to either of two constructions of permanent magnet assemblies to be hereinafter described and in which like reference numerals denote similar parts. According to the invention, the permanent magnets are constructed generally in the manner of the construction of a permanent magnet 100 illustrated in FIG. 3. The magnet 100 comprises an arcuate back plate 102 made, for example of steel and supported on support plates, for example the support plate 104, axially spaced on a shaft 105 and provided with hubs 106, 107 through which a stationary shaft 105 passes. The support members 104 are detachably secured to upstanding projections 102a welded on the back plate as illustrated. It will be understood that the shaft 105 is mounted in the manner of the shafts 12 and 61 heretofore described.

The permanent magnet 100 comprises a plurality, namely four, of pole assemblies 110–113 of alternate polarity. The even numbered pole assemblies 110, 112 may be considered to be of north magnetic polarity and the odd numbered pole assemblies 111, 113 may be considered to be of south magnetic polarity. Each pole is formed by an assembly of a plurality of stacks of pole pieces arranged axially on the magnet. For example, the pole 111 comprises nine stacks, two of which are designated with reference numerals, for example the stacks 121, 122. Each stack is made up of magnetic units 125. Each magnetic unit is in the form of a magnetic slab having a greater length and width dimension than thickness. The magnetic units are preferably made of a magnetic ceramic and have major opposite faces defining their thickness dimension and arranged within each stack with their major faces in an intimate face-to-face relationship. The stacks are arranged contiguous to each other with the magnetic units in end-to-end abutting relationship. The magnetic units in the stacks are of equal thickness so the stacks on each pole are of equal height. The units 125 in each stack are magnetized permanently in the same direction and in the direction of their thickness dimension which corresponds to magnetization in a direction substantially normal to the opposite faces defining the thickness dimension of the unit.

The successive stacks in each pole assembly are arranged in a row as illustrated in FIG. 3 and are secured to the steel back plate which has high magnetic permeability and is provided with flats, for example the flats 130, 131 extending longitudinally of the plate on which the innermost magnetic units 125 have their faces in intimate contact therewith. These flats are spaced angularly on the arcuate back plate and are on equidistant radii from the axis of rotation of the shaft. The flats need not have the same width when the pole pieces have different widths. In the illustrations in FIGS. 1 and 2 the pole pieces or magnetic units have the same width in all the poles. The outer units are, therefore, concentric and equally spaced radially inwardly from the inner surfaces of a cylindrical shell with which they are mounted concentrically.

In the magnet illustrated in FIG. 3 the magnetic units are each provided with a central hole and are held in fixed assembly on the stationary back plate by elongated hold down plates 135–138 of non-magnetizable material and bolts 140 passing through the center hole of the units and threaded into suitable threaded holes in the corresponding flats of the back plate. The endmost assemblies may be further fixed in position by non-magnetizable plates 141, 142 fixed to the back plate if desired.

The magnet 148 illustrated in FIG. 4 is constructed similarly to the other magnets and the magnetic units 125 are arranged on the magnet similarly to the magnet 100 and are held in position on flats on a steel back plate 149 by metallic magnet covers 150 made of non-magnetic material, for example stainless steel, formed as elongated channels provided with flanges 151, 152 disposed overlying each other in the successive pole assemblies and secured to the back plate by bolts 155. The channels extend longitudinally of the magnet and hold the magnetic units assembled in stacked relationship with the major faces thereof in face-to-face contact and the stacks in end-to-end relationship. The channels' depth is dimensioned to hold the units in intimate contact with each other and with the back plate 149 thereby to substantially eliminate reluctance in the magnet due to the contact surfaces of the various component parts of the flux circuit.

It will be understood that in each embodiment of the magnet of the invention the flux passes through the back plate, the air gap and the shell of the apparatus from one pole to another adjacent pole of alternate polarity whereby contiguous fields of alternate polarity are formed that coact to form a single magnetic field. In the various embodiments of the magnet, according to the invention, the direction of the lines of force of the flux are illustrated by the arrows 156. Because of the manner in which the stacks of magnetic units are mounted angularly spaced as illustrated and directly on a back plate the total flux in the individual pole assemblies passes through the air gap, for example in FIG. 4, the air gap 160, formed with a non-magnetic cylindrical shell 161 between the poles of alternate polarity so that all of the flux in each pole is available as energy to efficiently develop magnetic fields of opposite polarity and of high coercive strength without the usual flux leakage found in other known separators. Moreover, in each embodiment the entire magnet may be positioned angularly relative to the shaft from which it depends as required to properly position the poles relative to the shell and the rest of the separator or attractor. While the cylindrical shell in each embodiment is shown and described as non-magnetic it will be understood that if a relatively thin shell is used it may be made of a magnetic material.

In the illustration in FIG. 4 the magnetic poles have the outer magnetic units provided with an arcuate outer surface 170 configured to define a substantially uniform air gap throughout the width of the individual poles. The outer major faces of the end magnetic units are equidistant from the inner surface of the shell and, therefore, substantially equidistant radially from its conveyor outer surface.

The permanent magnet units are preferably made of a non-metallic material comprising magnetic ceramic material, for example barium ferrites. These ceramic materials can be magnetized in the direction of the thickness dimension of the units and have a high degree of permanency of magnetization. While the magnet units as disclosed preferably have a greater length and width dimension than thickness it is to be understood that the thickness can be greater than the other dimensions but the arrangement in such a case is the same as described with respect to the embodiments illustrated. Because of the arrangement of the units it is apparent that assemblies without the use of a back plate in an arrangement, according to the invention, require twice as much flux to have the same effective flux in the air gap and, accordingly, require larger magnet constructions to accomplish the same amount of work.

While preferred embodiments of the separators and permanent magnets, according to the invention, have been shown and described, it will be understood that many modifications and changes can be made within the true spirit and scope of the invention.

What we claim and desire to secure by Letters Patent is:

1. In a magnetic separator having driven means defining
    a drum having a non-magnetizable, travelling conveyor surface for removing magnetizable material from a stream of material comprising magnetizable and non-magnetizable material brought into contact with said conveyor surface,
    said drum made up of a generally cylindrical non-magnetizable shell comprising said conveyor surface,
    a shaft concentrically disposed in said shell,
    a back plate made of magnetic material fixed to said shaft,
    and a plurality of pole assemblies fixed to said back plate and extending radially outwardly therefrom and terminating adjacent the inner periphery of said shell,
    each said pole assembly comprising at least one stack of magnetic units, each unit having both a greater length and width than thickness and disposed with its length generally parallel to said shaft,
        said magnetic units having opposite major faces and being arranged with said major faces in face to face relationship within a respective stack,
    said units within a given assembly having permanent magnetization in the same direction through the thickness dimension,
    said direction of magnetization corresponding to magnetization in a direction substantially normal to the opposite major faces defining said thickness dimension.

2. The magnetic separator recited in claim 1 wherein said conveyor comprises a plate generally concentric to said shell and below said shell and spaced therefrom defining a flow passage therebetween,
    and an inlet to said flow passage for magnetic material and an outlet therefrom to a container.

3. The magnetic separator recited in claim 1 wherein said back plate comprises a plate made of stainless steel fixed to said shaft and spaced outwardly therefrom,
    and non-magnetic covers comprising a non-magnetic strip fixed to said plate and holding said units to said plate.

4. The separator recited in claim 3 wherein each said stack in a said assembly has an end magnetic unit on a common end having a major face in intimate contact with said back plate,
    said stacks of each said assembly each having an end opposite to said end on said plate having an end magnetic unit adjacent said conveyor surface defining a gap between respective assemblies and said conveyor surface,
    said conveyor surface being disposed between a magnet and said material whereby said back plate provides a continuous flux path between the successive stacks of an assembly to cause all of the flux in each assembly to effectively develop the maximum possible coercive magnetic force to attract said magnetizable material to said conveyor surface.

5. The separator recited in claim 1 wherein said back plate is made of steel.

6. The separator recited in claim 1 wherein said magnetic units comprise magnetized ceramic units.

7. The separator recited in claim 6 wherein said magnetic units are in the form of slabs.

8. The separator recited in claim 1 wherein conduit means is disposed in contact with said conveyor surface,
    said conduit means comprising a plate like member disposed adjacent said shell and spaced therefrom and extending generally concentric thereto over a part of the length of said plate like member,
    means to admit material from said stream adjacent one end of said plate like member,
    means to discharge said non-magnetizable material at an intermediate part of said plate like member,
    and means to discharge said magnetizable material adjacent the other end of said plate like member.

9. The separator recited in claim 1 wherein conduit means is disposed in contact with said conveyor surface,
    said conduit means comprising a plate like member disposed adjacent said shell and spaced therefrom and extending generally concentric thereto over a part of said plate like member,
    means to admit said material from said stream at an intermediate part of said plate like member, means to discharge said non-magnetizable material at an intermediate part of said plate like member, and means to discharge said magnetic material at an end of said stream on the side of said stream remote from said non-magnetic material discharge means.

10. The separator recited in claim 1 wherein
said shell is rotatable, and said magnetic units are fixed, said magnetic units being disposed on less than one hundred eighty degrees of the inside periphery of said drum.

11. In a magnetic separator having driven means defining
a non-magnetizable, travelling drum conveyor for removing magnetizable material from a stream of material comprising magnetizable and non-magnetizable materials brought into contact with said conveyor, a shaft concentrically disposed in said conveyor, a back plate made of magnetic material fixed to said shaft, and a plurality of pole assemblies fixed to said back plate and extending radially outwardly therefrom and terminating adjacent said conveyor, each said pole assembly comprising at least one stack of magnetic units, each unit having both a greater length and width than thickness and disposed with its length generally parallel to said shaft, said magnetic units having opposite major faces and arranged with said major faces in face to face relationship within a respective stack.

said units within a given assembly having permanent magnetization in the same direction through the thickness dimension, said direction of magnetization corresponding to magnetization in a direction substantially normal to the opposite major faces defining said thickness dimension.

12. The separator recited in claim 11 wherein
said back plate comprises a plate made of stainless steel fixed to said shaft and spaced outwardly therefrom, and non-magnetic covers comprising a non-magnetic strip fixed to said plate and holding said units to said plate.

13. The separator recited in claim 11 wherein
an elongated non-magnetic hold down strip is fixed to the axial center line of each said stack of said magnetic units adjacent said conveyor.

References Cited in the file of this patent
UNITED STATES PATENTS

| | | |
|---|---|---|
| 2,559,565 | Crochett | July 3, 1951 |
| 2,675,918 | Newton | Apr. 20, 1954 |
| 2,711,249 | Laurila | June 21, 1955 |
| 2,785,801 | Laurila | Mar. 19, 1957 |
| 2,992,736 | Buus et al. | July 18, 1961 |
| 2,992,737 | Buus | July 18, 1961 |
| 2,992,738 | Maynard | July 18, 1961 |

FOREIGN PATENTS

| | | |
|---|---|---|
| 973,611 | Germany | Apr. 14, 1960 |